US009432546B2

United States Patent
Tanaka

(10) Patent No.: US 9,432,546 B2
(45) Date of Patent: Aug. 30, 2016

(54) IMAGE FORMING APPARATUS AND METHOD OF STARTING UP MODULES IN THE IMAGE FORMING APPARATUS

(71) Applicant: Kengo Tanaka, Tokyo (JP)

(72) Inventor: Kengo Tanaka, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/881,258

(22) Filed: Oct. 13, 2015

(65) Prior Publication Data

US 2016/0127593 A1 May 5, 2016

(30) Foreign Application Priority Data

Oct. 31, 2014 (JP) .................. 2014-223405

(51) Int. Cl.
*G03G 15/00* (2006.01)
*H04N 1/00* (2006.01)

(52) U.S. Cl.
CPC .......... *H04N 1/00928* (2013.01); *G03G 15/80* (2013.01); *H04N 1/00904* (2013.01); *H04N 1/00931* (2013.01); *G03G 15/5004* (2013.01)

(58) Field of Classification Search
CPC ..................... H04N 1/00928; H04N 1/00931; G03G 15/5004; G03G 15/80
USPC ........................................................... 399/70
See application file for complete search history.

(56) References Cited

U.S. PATENT DOCUMENTS

| 2005/0135828 A1* | 6/2005 | Joichi .................... G03G 15/80 |
| | | 399/75 |
| 2009/0196645 A1* | 8/2009 | Li ....................... G03G 15/2039 |
| | | 399/70 |
| 2013/0164018 A1* | 6/2013 | Morris .................. G06F 1/3284 |
| | | 399/88 |

* cited by examiner

*Primary Examiner* — David Gray
*Assistant Examiner* — Tyler Hardman
(74) *Attorney, Agent, or Firm* — Harness, Dickey & Pierce, P.L.C.

(57) ABSTRACT

An image forming apparatus is provided. The image forming apparatus includes an electric power supply, a plurality of modules, a startup time calculator, and a fastest startup pattern determiner. The plurality of modules include a plurality of direct current (DC) modules and at least one alternating current (AC) module, and the modules are to be driven by an electric power supplied from the electric power supply. The startup time calculator calculates a startup time of each of the modules. The fastest startup pattern determiner determines a fastest startup pattern based on the startup time of each of the modules calculated by the startup time calculator, and starts up the modules in accordance with the determined fastest startup pattern. The fastest startup pattern is determined based on a longest startup time among the startup times of the DC and AC modules.

8 Claims, 10 Drawing Sheets

CONDITION (1) FASTEST DC STARTUP PATTERN

CONDITION (2) FASTEST AC STARTUP PATTERN (RELATED ART)

CONDITION (3) AC/DC STARTUP SIMULTANEOUSLY

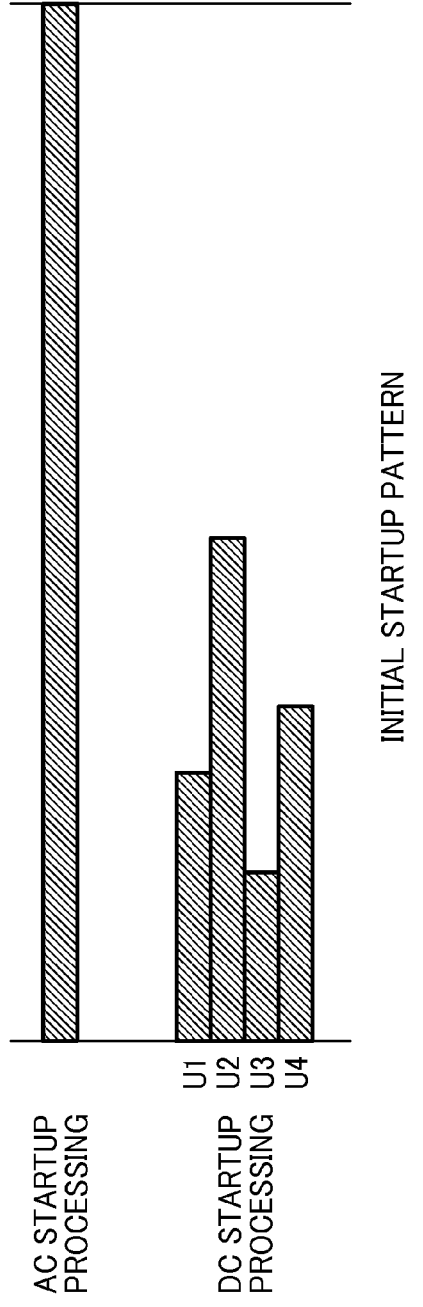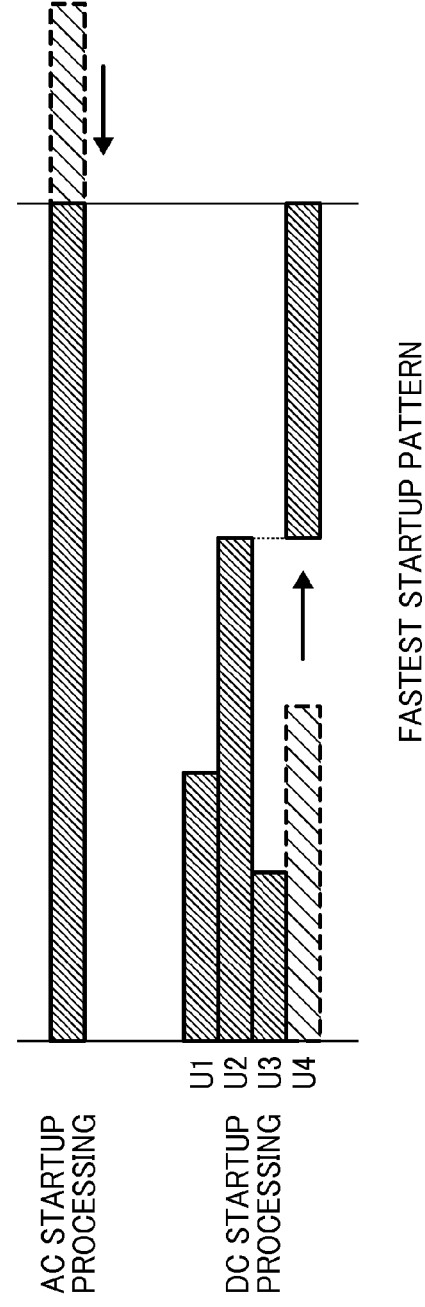

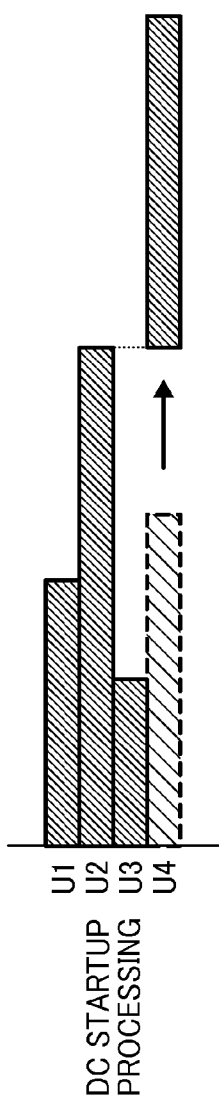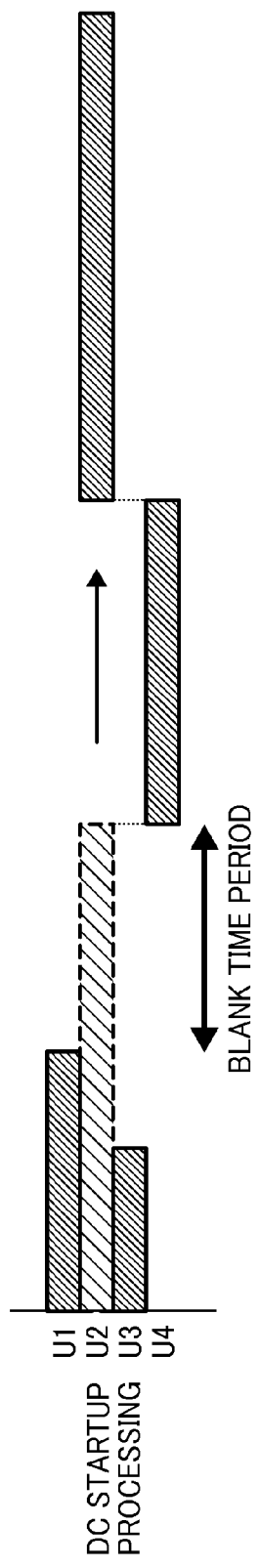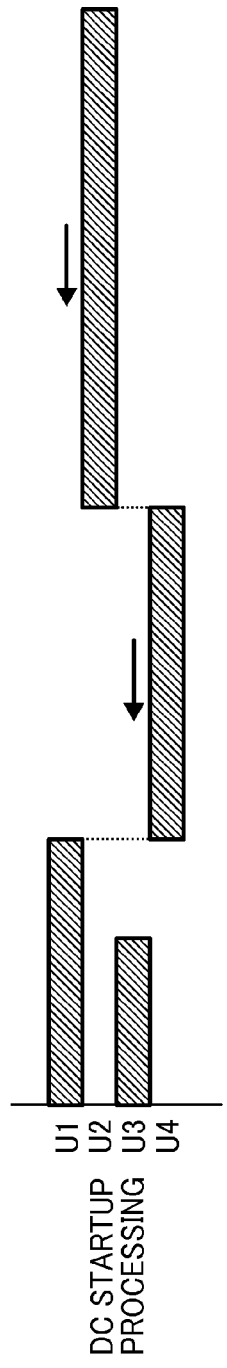

IMAGE FORMING APPARATUS AND METHOD OF STARTING UP MODULES IN THE IMAGE FORMING APPARATUS

CROSS-REFERENCE TO RELATED APPLICATIONS

This patent application is based on and claims priority pursuant to 35 U.S.C. §119(a) to Japanese Patent Application No. 2014-223405, filed on Oct. 31, 2014, in the Japan Patent Office, the entire disclosure of which is hereby incorporated by reference herein.

BACKGROUND

1. Technical Field

The present disclosure relates to an image forming apparatus and a method of starting up modules in the image forming apparatus.

2. Description of the Related Art

An image forming apparatus to which multiple peripherals are connectable, such as copier and network compatible image forming apparatus, generally includes an energy saving mode controller and an operation mode controller. The energy saving mode controller is capable of controlling electric power consumed by the peripherals. The operation mode controller acquires operation modes from the multiple peripherals, determines the method of operation, and switching the operation modes of the peripherals. For the purpose of shortening startup time, a startup control which changes the timing of starting a startup processing of each peripheral unit is known.

A conventional startup control is based on a precondition that an image forming apparatus is started up from a condition in which a fixing device, which is an alternating current (AC) unit, has been sufficiently cooled. In other words, since it generally takes a long time for the AC unit until a heater temperature thereof reaches a target temperature, a conventional startup control is based on a precondition that the startup time of AC unit is longer than that of direct current (DC unit), i.e., the fixing process is rate-limiting.

However, there exists an actual practical situation where an image forming apparatus is powered on again immediately after being powered off. In this case, the startup time of DC unit can be longer than that of AC unit because heat is remaining in the heater. Under the above condition, the startup time of the whole apparatus including the AC unit cannot be sufficiently shortened by the conventional startup control that is based on the precondition that the startup time of AC unit is longer than that of DC unit.

It is to be noted the term "unit" used in the above contexts corresponds to another term "module" hereinafter used in the present disclosure.

SUMMARY

In accordance with some embodiments of the present invention, an image forming apparatus is provided. The image forming apparatus includes an electric power supply, a plurality of modules, a startup time calculator, and a fastest startup pattern determiner. The plurality of modules include a plurality of direct current (DC) modules and at least one alternating current (AC) module, and the modules are to be driven by an electric power supplied from the electric power supply. The startup time calculator calculates a startup time of each of the modules. The fastest startup pattern determiner determines a fastest startup pattern based on the startup time of each of the modules calculated by the startup time calculator, and starts up the modules in accordance with the determined fastest startup pattern. The fastest startup pattern is determined based on a longest startup time among the startup times of the DC and AC modules.

In accordance with some embodiments of the present invention, a method of starting up a plurality of modules, including a plurality of DC modules and at least one AC module, included in an image forming apparatus to be driven by an electric power supplied from an electric power supply is provided. The method includes the steps of calculating a startup time of each of the modules and determining a fastest startup pattern based on the calculated startup time of each of the modules. The step of determining a fastest startup pattern further includes the steps of determining the fastest startup pattern based on a longest startup time among the startup times of the DC modules and the AC module, and starting up the modules in accordance with the determined fastest startup pattern.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 10A is a diagram showing an initial startup pattern;
FIG. 10B is an illustration showing a fastest startup pattern searching operation; and FIGS. 11A to 11C are illustrations showing processes for changing the formation of fastest startup pattern.

Figure 1:
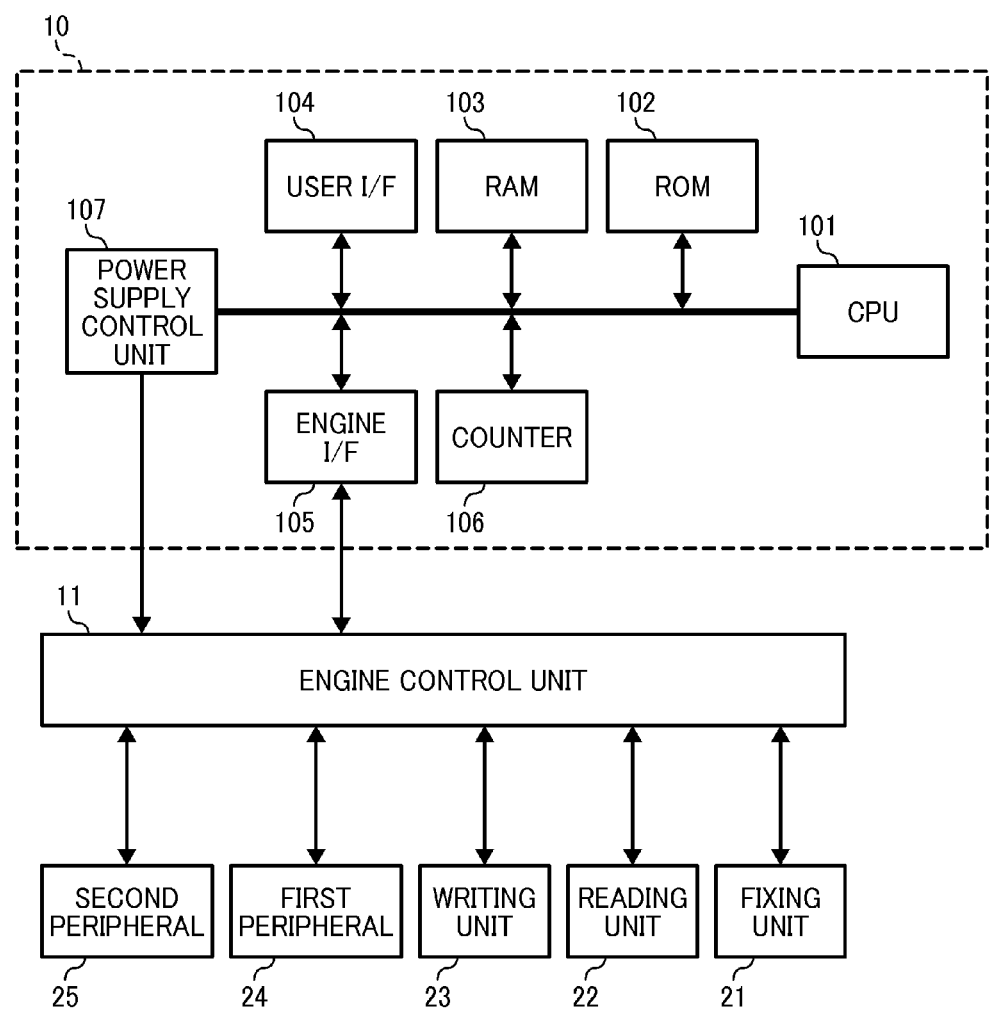
FIG. 1 is a block diagram of a control part of an electrophotographic image forming apparatus in accordance with an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

In accordance with some embodiments of the present invention, an image forming apparatus having a shortened startup time is provided. The shortened startup time is determined considering the startup time and power consumption at the startup with respect to both AC and DC modules.

FIG. 1 is a block diagram of a control part of an electrophotographic image forming apparatus in accordance with an embodiment of the present invention.

The control part includes a controller control unit 10, an engine control unit 11, a fixing unit 21, a reading unit 22, a writing unit 23, a first peripheral 24, and a second peripheral 25. The controller control unit 10 includes a central processing unit (CPU) 101, a read only memory (ROM) 102, a random access memory (RAM) 103, a user interface (I/F) 104, an engine I/F 105, a counter 106, and a power supply control unit 107.

The controller control unit 10 has functions of controlling the user I/F 104 such as universal serial bus (USB) of image forming apparatus, wired local area network (LAN), and wireless LAN; processing (e.g., reducing, rotating) image data read by the reading unit 22 in copy operation; and transmitting image data having been processed through the engine I/F 105 to the engine control unit 11.

The engine control unit 11 controls the fixing unit 21, the reading unit 22, the writing unit 23, the first peripheral 24, and the second peripheral 25, and executes image formation controls (i.e., reading control, writing control, image formation, paper conveyance, toner supply, and fixing control) in copy operation.

The CPU 101 functions as a startup time calculator that calculates a startup time of each module to be described later. The RAM 103 functions as a holder that holds startup power and standby power for each and every module.

In this image forming apparatus, as a main power supply is turned on, power is supplied from a power supply unit 31 (illustrated in FIG. 2) to the controller control unit 10. As power is supplied to the controller control unit 10, the CPU 101 puts the counter 106 into operation to start counting a count value from the time of turning on the main power supply. The CPU 101 expands a startup processing time of each module, i.e., the fixing unit 21, the reading unit 22, the writing unit 23, the first peripheral 24, and the second peripheral 25, stored in the ROM 102 to the RAM 103, and determines (or calculates) a startup pattern that defines a startup order and a startup timing of each module. Thereafter, the CPU 101 calculates a power supply timing count value of each module counted from the time of turning on the main power supply, and expands them to the RAM 103.

The CPU 101 then determines whether or not the count value counted from the time of turning on the main power supply exceeds the power supply timing count value of any of the modules (i.e., the fixing unit 21, the reading unit 22, the writing unit 23, the first peripheral 24, and the second peripheral 25). When it is determined that the count value exceeds one of the power supply timing count values, a control signal for supplying power to the module is transmitted to the engine control unit 11. For example, in the case where the power supply timing count value of the second peripheral 25 is 1,000 and the count value counted from the time of turning on the main power supply exceeds 1,000, a control signal for supplying power to the second peripheral 25 is transmitted to the engine control unit 11.

Figure 2:
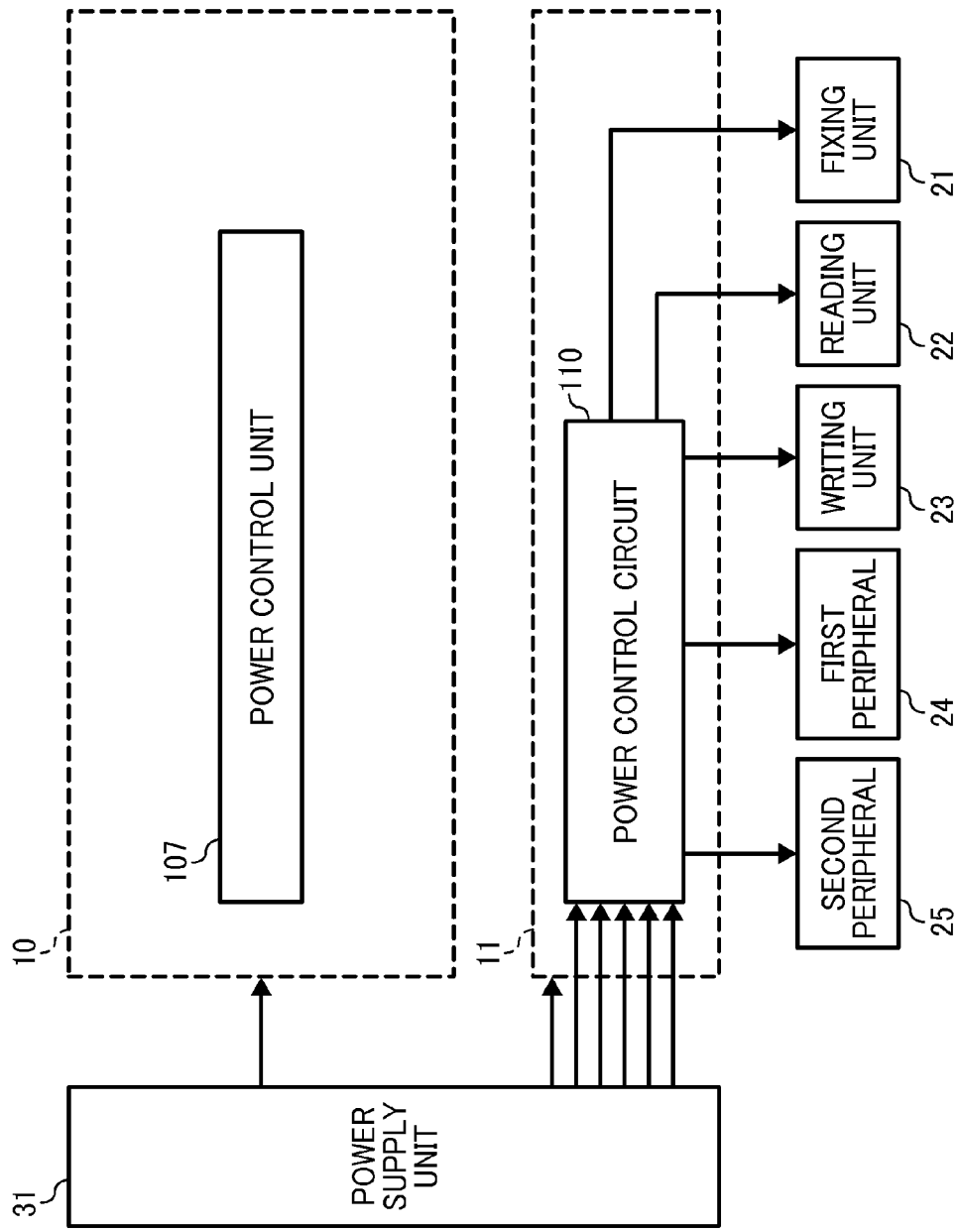
FIG. 2 is a block diagram of a power supply path to a fixing unit, a reading unit, a writing unit, a first peripheral, and a second peripheral of the image forming apparatus showing supply control, in accordance with an embodiment of the present invention.

FIG. 2 is a block diagram of a power supply path to the fixing unit 21, the reading unit 22, the writing unit 23, the first peripheral 24, and the second peripheral 25 showing supply control, in accordance with an embodiment of the present invention. Power is supplied to the fixing unit 21, the reading unit 22, the writing unit 23, the first peripheral 24, and the second peripheral 25 from the power supply unit 31 through a power control circuit 110 of the engine control unit 11. To the power control circuit 110, a power supply control signal is transmitted from the power supply control unit 107 of the controller control unit 10.

Figure 3:
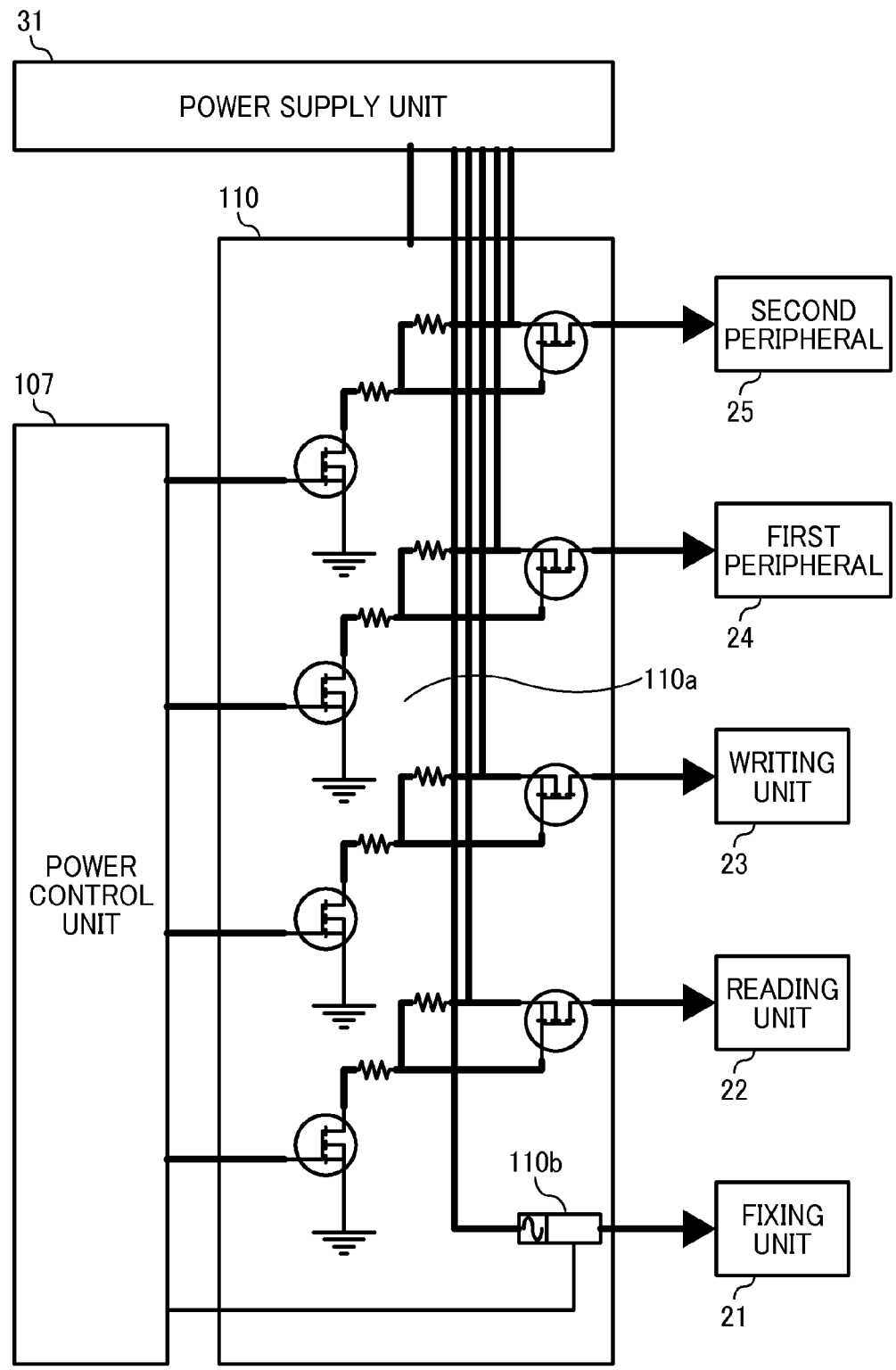
FIG. 3 is a block diagram of a power control circuit in an engine control unit in accordance with an embodiment of the present invention.

FIG. 3 is a block diagram of the power control circuit 110 in the engine control unit 11.

The power control circuit 110 includes an on-off switching circuit 110b composed of an N-ch MOSFET (metal-oxide-semiconductor field-effect transistor) and a P-ch MOSFET. The power control circuit 110 controls power supply to the modules driven by DC power supply (hereinafter "DC modules"), i.e., the reading unit 22, the writing unit 23, the first peripheral 24, and the second peripheral 25. As an H-level control signal is transmitted from the power supply control unit 107, the power supply unit 31 supplies power to each module by the on-off switching circuit 110b in the power control circuit 110. By contrast, as an L-level control signal is transmitted, power supply to each module is suspended.

In the on-off switching circuit 110b, the N-ch MOSFET and the P-ch MOSFET may be respectively replaced with an NPN transistor and a PNP transistor. Even in this case, the on-off switching circuit 110b can perform a similar operation.

Since the fixing unit 21 is a module driven by AC power supply (hereinafter "AC module"), the on-off switching circuit 110b is composed of an AC relay circuit, different from a DC power control circuit 110a. Thus, the fixing unit 21 can be on-off switching controlled. The on-off switching circuit 110b is controlled to supply power or suspend power supply depending on the status (H level or L level) of the control signal from the power supply control unit 107.

The power control circuit 110 can control power supply to each module (i.e., the fixing unit 21, the reading unit 22, the writing unit 23, the first peripheral 24, and the second peripheral 25) at a different timing.

Power supplied from the power supply unit 31 to each module per hour (i.e., power consumed in each module per hour) is always constant. In addition, available power from the power supply unit 31 to each module is also constant (for example, 1.5 kW at the maximum). Thus, the following formula (1) is satisfied.

(Maximum available power from the power supply unit 31)=(Maximum power consumption in DC modules)+(Maximum power consumption in AC module)     (1)

DC power and AC power supplied from the power supply unit 31 are in the relationship of trade-off. For example, in the case of using power at a maximum, AC power can be increased if DC power can be decreased. In this case, the startup time of the AC module can be shortened. Generally, startup power is larger than standby power.

A fastest startup pattern, to be described below, is determined considering this fact.

Figure 4A:
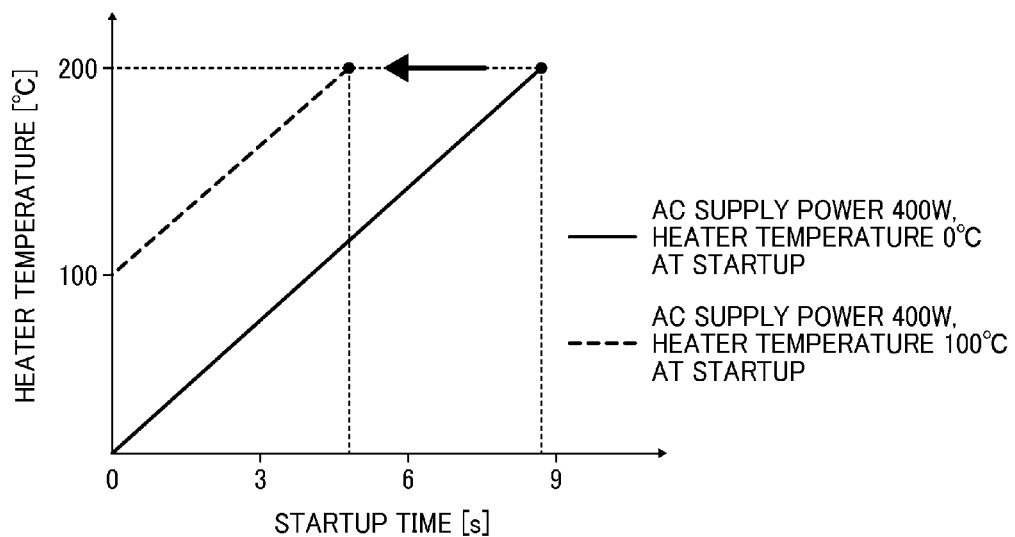
FIGS. 4A and 4B are graphs showing relationships among heater temperature, supplied power, and startup time in accordance with an embodiment of the present invention.
Figure 4B:
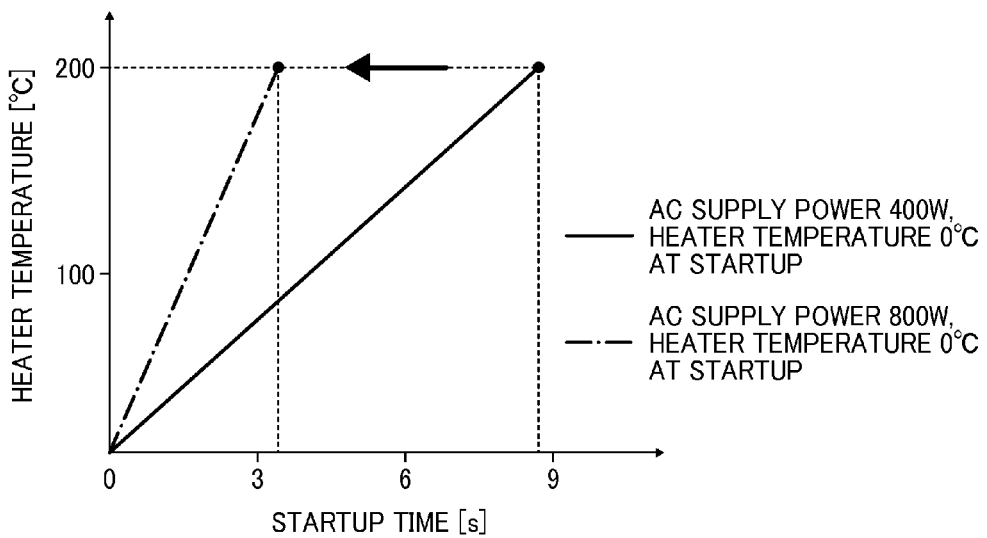

FIGS. 4A and 4B are graphs showing relationships among heater temperature, supplied power, and startup time.

FIG. 4A indicates that, in the case where the heater temperature is kept high at the time of startup, such as in the case the apparatus is restarted after once started, the time until the heater temperature reaches a target temperature, i.e., the startup time, becomes short. FIG. 4B indicates that as power supplied to AC module is increased, the startup time becomes short.

The startup time of the AC module is calculated from the power supplied to the AC module, the initial heater temperature, and temperature characteristics of the heater.

By calculating the startup time in accordance with the amount of heat and the amount of AC power held by the heater at the time of startup of the AC module, the startup time can be shortened regardless of the target temperature of the heater.

In a related art, a startup pattern is specified by a calculation operation in such a manner that the maximum power consumption at the startup of DC modules is minimized, thereby supplying more power to AC module and shortening the startup time. This technology is based on a precondition that the startup time of AC module is longer enough than that of DC module.

However, there exists an actual practical situation where an image forming apparatus is used under the condition that the startup time of DC module is longer than that of AC module. For example, in the case where the apparatus is powered off immediately after printing operation, the heater temperature of the AC module remains high. As the apparatus is powered on again under the above condition, since the difference between the heater temperature and a target temperature is small, the AC module starts up with a shorter startup time. By contrast, the startup time of the DC modules is constant regardless of the length of time between powering off and on of the apparatus. Therefore, the startup time of the DC modules can be longer than that of AC module.

Accordingly, the startup time of the whole apparatus cannot always be shortened under the precondition that the startup time of AC module is longer than that of DC module.

One object of the present invention is to solve such a problem.

Some embodiments of the present invention are described below under the following two preconditions: 1) Available power from a power supply to AC and DC modules has an upper limit; and 2) Power supplied to AC and DC modules is always constant (i.e., does not vary with time).

Figure 5:
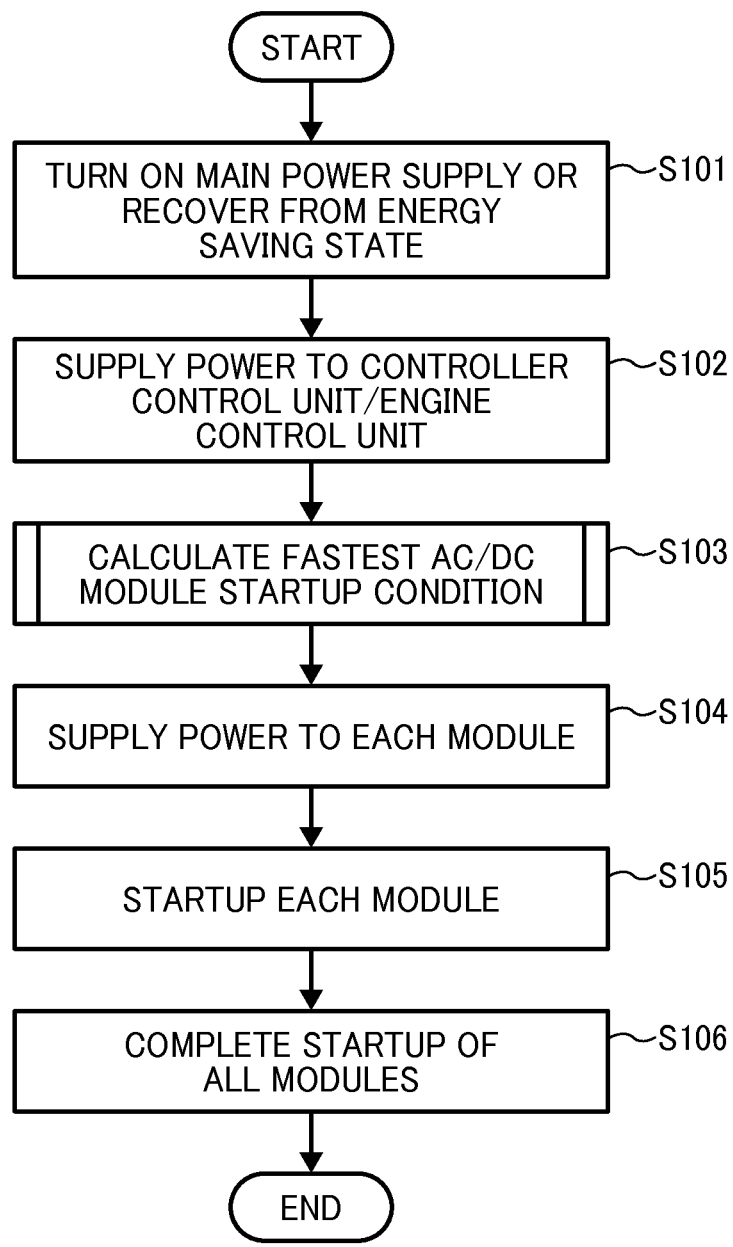
FIG. 5 is a flowchart illustrating a startup control operation in accordance with an embodiment of the present invention.

FIG. 5 is a flowchart illustrating a startup control operation in accordance with an embodiment of the present invention.

As the main power supply is turned on or the apparatus is recovered from an energy saving state (S101), power is supplied from the power supply unit 31 (illustrated in FIG. 2) to the controller control unit 10 and the engine control unit 11 (S102). In the case of turning on the main power supply, power is supplied to both the controller control unit 10 and the engine control unit 11. In the case of recovering from the energy saving state, power is supplied only to the engine control unit 11 because the controller control unit 10 has not been shut off from the power supply under the energy saving state.

Next, a fastest startup condition in which all the AC and DC modules start up at the fastest speed (i.e., the startup times of all the AC and DC modules are shortest), and a startup pattern therefor are calculated (or determined) by the CPU 101 and stored in the RAM 103 (S103). Power is then supplied to each module based on the calculated startup pattern (S104). Each module starts a startup processing based on the calculated startup pattern (S105). All the modules complete their startup processing (S106), and the startup control operation of the image forming apparatus is completed.

A fastest startup condition calculation operation for AC and DC modules is described below.

Figure 6:
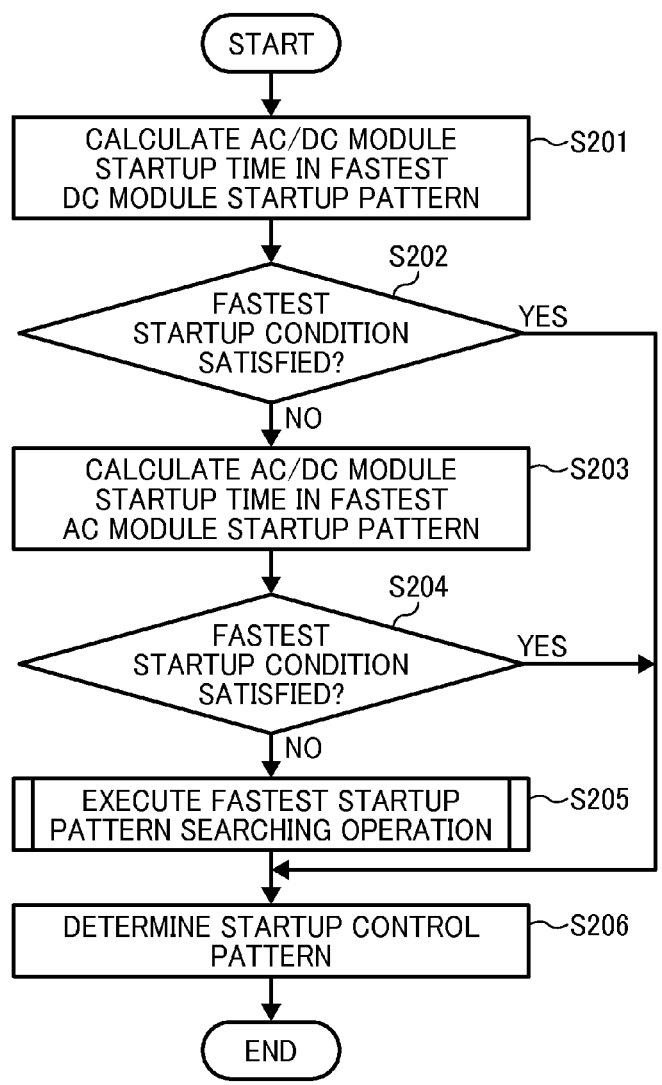
FIG. 6 is a flowchart illustrating a fastest startup condition calculation operation in accordance with an embodiment of the present invention.

FIG. 6 is a flowchart illustrating a fastest startup condition calculation operation in accordance with an embodiment of the present invention.

First, startup times of the AC and DC modules in a startup pattern in which the DC modules start up at the fastest speed are calculated (S201).

Next, whether the startup times of the AC and DC modules calculated in step S201 satisfy the fastest startup condition or not is determined (S202). If it is determined that the startup times satisfy the fastest startup condition ("Yes" in S202), the present startup pattern is determined as a startup control pattern of the image forming apparatus (S206), and the operation ends. If it is determined that the startup times do not satisfy the fastest startup condition ("No" in S202), the operation proceeds to S203.

In step S203, startup times of the AC and DC modules in a startup pattern in which the AC module starts up at the fastest speed are calculated (S203). Next, whether the startup times of the AC and DC modules calculated in step S203 satisfy the fastest startup condition or not is determined (S204). If it is determined that the startup times satisfy the fastest startup condition ("Yes" in S204), the present startup pattern is determined as a startup control pattern of the image forming apparatus (S206), and the operation ends. If it is determined that the startup times do not satisfy the fastest startup condition ("No" in S204), the operation proceeds to S205.

Proceeding to step S205 indicates that the startup speeds of the AC and DC modules in the above startup patterns are not the fastest, and there is a room for more shortening the startup times of the AC and DC modules by adjusting the startup order and startup timing of each the modules. Thus, a processing for searching a fastest startup pattern is further executed (S205). The searched fastest startup pattern is then determined as a startup control pattern (S206), and the operation ends.

The processing in step S201 in FIG. 6, for calculating startup times of the AC and DC modules in a startup pattern in which the DC module starts up at the fastest speed (hereinafter "fastest DC startup pattern"), is described in detail below.

Figure 7:
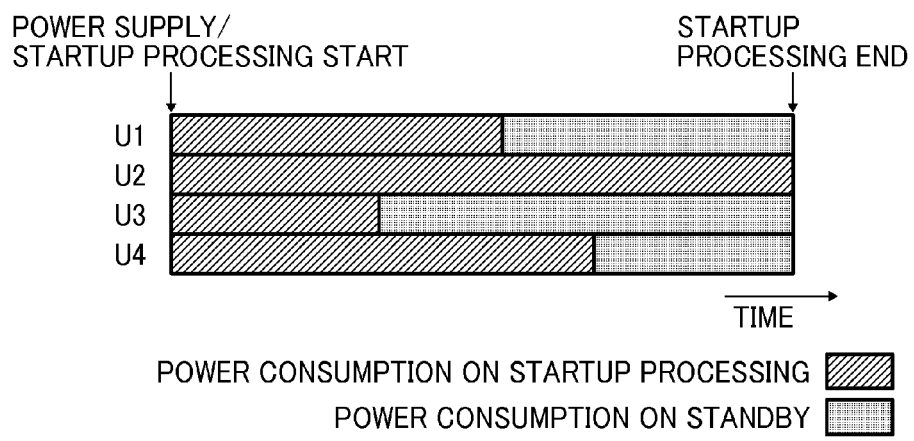
FIG. 7 is a startup timing diagram of DC modules in the fastest startup pattern defined in step S201 in FIG. 6.

FIG. 7 is a startup timing diagram of DC modules in the fastest DC startup pattern defined in step S201 in FIG. 6.

In this startup pattern, all the DC modules (represented by U1 to U4 in FIG. 7) start a startup processing at the time of starting power supply. In this case, the startup time of the DC modules U1 to U4 is shortest. On the other hand, power consumption at starting startup processing of the DC modules is maximum (i.e., power supply to the AC module is minimum), and therefore the startup time of the AC module is longest.

Figure 8:
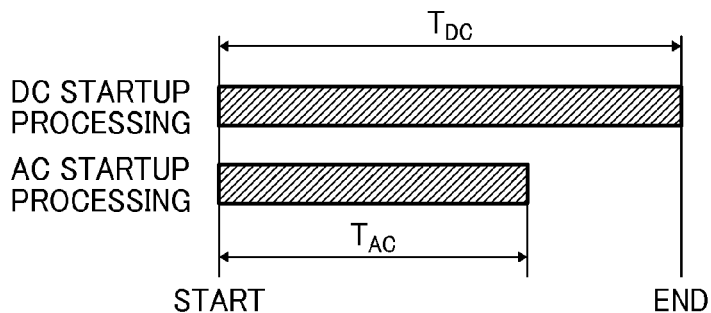
FIG. 8 is an illustration for explaining an operation for calculating startup times of AC and DC modules in step S203 in FIG. 6.
Figure 8:
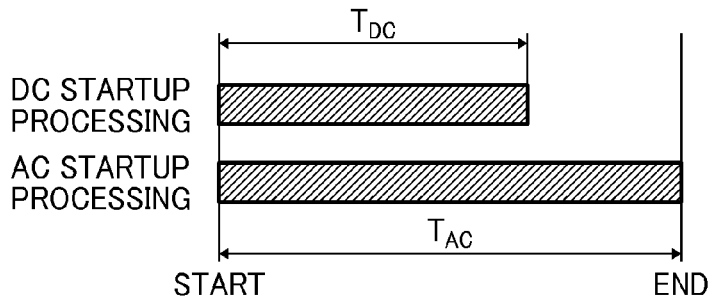
Figure 8:
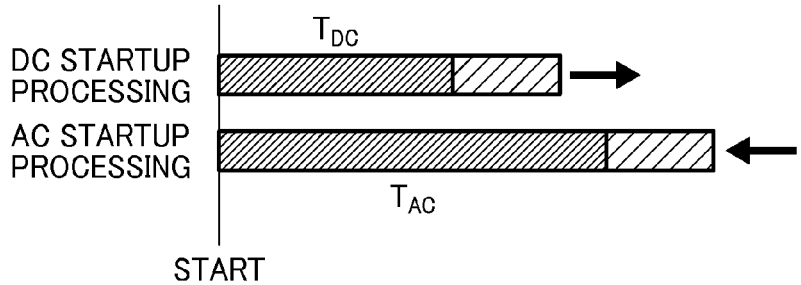

Referring to FIG. 8, $T_{DC}$ represents a DC module startup time that is equivalent to the startup time of U2 that is the longest among those of U1 to U4, as shown in FIG. 7. The power supplied to the AC module is determined from the difference between the maximum available power from the power supply unit 31 and the maximum power consumption in the DC modules. The maximum power consumption in the DC modules is determined from the sum of the startup power for the DC modules U1 to U4 in FIG. 7. An AC module startup time is calculated from the heater temperature at the time of startup and the power supplied to the AC module, as described above.

The processing in step S203 in FIG. 6, for calculating startup times of the AC and DC modules in a startup pattern in which the AC module starts up at the fastest speed (hereinafter "fastest AC startup pattern"), is described in detail below with reference to FIG. 8.

In this DC module startup time calculation processing, a startup pattern in which the maximum power consumption in the DC modules is minimum is used. Such a startup pattern is determined by, as shown in FIG. 10B, calculating and comparing the maximum power consumption with respect to multiple startup patterns obtained by rearranging the startup patterns of the DC modules.

In this startup pattern, the startup time of the DC modules is shortened as much as possible and the maximum power consumption in the DC module is reduced as much as possible, and therefore more power is supplied to the AC module. Thus, in a startup operation using this startup pattern, the startup time of the AC module becomes shortest.

The processing in step S202 (for determining whether AC and DC modules startup times in the fastest DC startup pattern satisfy the fastest startup condition or not) and step S204 (for determining whether AC and DC modules startup times in the fastest AC startup pattern satisfy the fastest startup condition or not) is described in detail below.

A startup pattern which satisfies one of the following three conditions under the above-described preconditions can be the fastest startup pattern.

(1) When $T_{DC}$ (startup time of DC module)>$T_{AC}$ (startup time of AC module), all the modules start a startup processing at the time of turning on the power supply.

(2) When $T_{AC}$>$T_{DC}$, the startup pattern depends on the startup time of the AC module. The startup order of each of the DC modules is changed so that the maximum power consumption in the DC modules becomes minimum while keeping the startup time of the DC modules within the range of the startup time of the AC module.

(3) When $T_{AC} \approx T_{DC}$, the DC and AC modules start and complete a startup processing at the same time. In other words, the DC module startup time is equal to the AC module startup time.

In the context of the present disclosure, the terms "equal", "equivalent", "same", or the like, do not require completeness, and may include the meanings of adverbial modifiers such as "approximately-", "nearly-", "almost-", or the like, within the bounds of technical common sense.

The above conditions (1) to (3) are described in detail below.

Condition (1) In this startup pattern in which all the DC modules start a startup processing at the time of turning the power supply on, the startup time of the DC module becomes shortest. No other startup pattern exists in which the DC module startup time is much shorter. When the AC module startup time is shorter than the DC module startup time, the DC module startup time is rate-limiting. Therefore, when condition (1) is satisfied, it is determined that the DC module startup time cannot be shortened any more, and such a startup pattern is determined as the fastest startup pattern of the apparatus.

Condition (2) No other startup pattern exists in which the AC module startup time is much shorter than this pattern. Therefore, the AC module startup time is rate-limiting. When condition (2) is satisfied, it is determined that the AC module startup time cannot be shortened any more, and such a startup pattern is determined as the fastest startup pattern of the apparatus.

In this case, the CPU 101 calculates power consumption in the DC modules with respect to startup order patterns in which each of the DC modules is started up one by one in series while keeping the DC module startup time within the range of the AC module startup time (i.e., patterns in which the startup order of each module is rearranged), and specifies a startup order pattern in which the maximum power consumption (=startup power+standby power) in the DC modules is minimum.

Owing to the specified startup order pattern, the amount of startup power of the AC module is increased and the startup speed of the AC module is increased.

Condition (3) Condition (3) is a fastest startup condition which is applied when the conditions (1) and (2) are not determined as fastest startup conditions in respective steps S202 and S204.

An image forming apparatus composed of AC module and DC module cannot complete its startup processing unless both the AC and DC module have completed their startup processing even when one of the AC or DC module has completed its startup processing. To complete the startup processing of the whole apparatus, both the AC and DC modules needs to complete their startup processing.

Since DC power and AC power are in the relation of trade-off, the startup time of the whole apparatus becomes shortest when both the AC and DC modules start and complete a startup processing at the same time.

If no fastest startup pattern is determined through steps S201 to S204 illustrated in FIG. 6, a processing for searching a startup pattern which satisfies the condition (3) is executed in step S205.

A fastest startup pattern searching processing in step S205 illustrated in FIG. 6, which is executed when no fastest startup pattern has been determined, is described in detail below.

Figure 9:
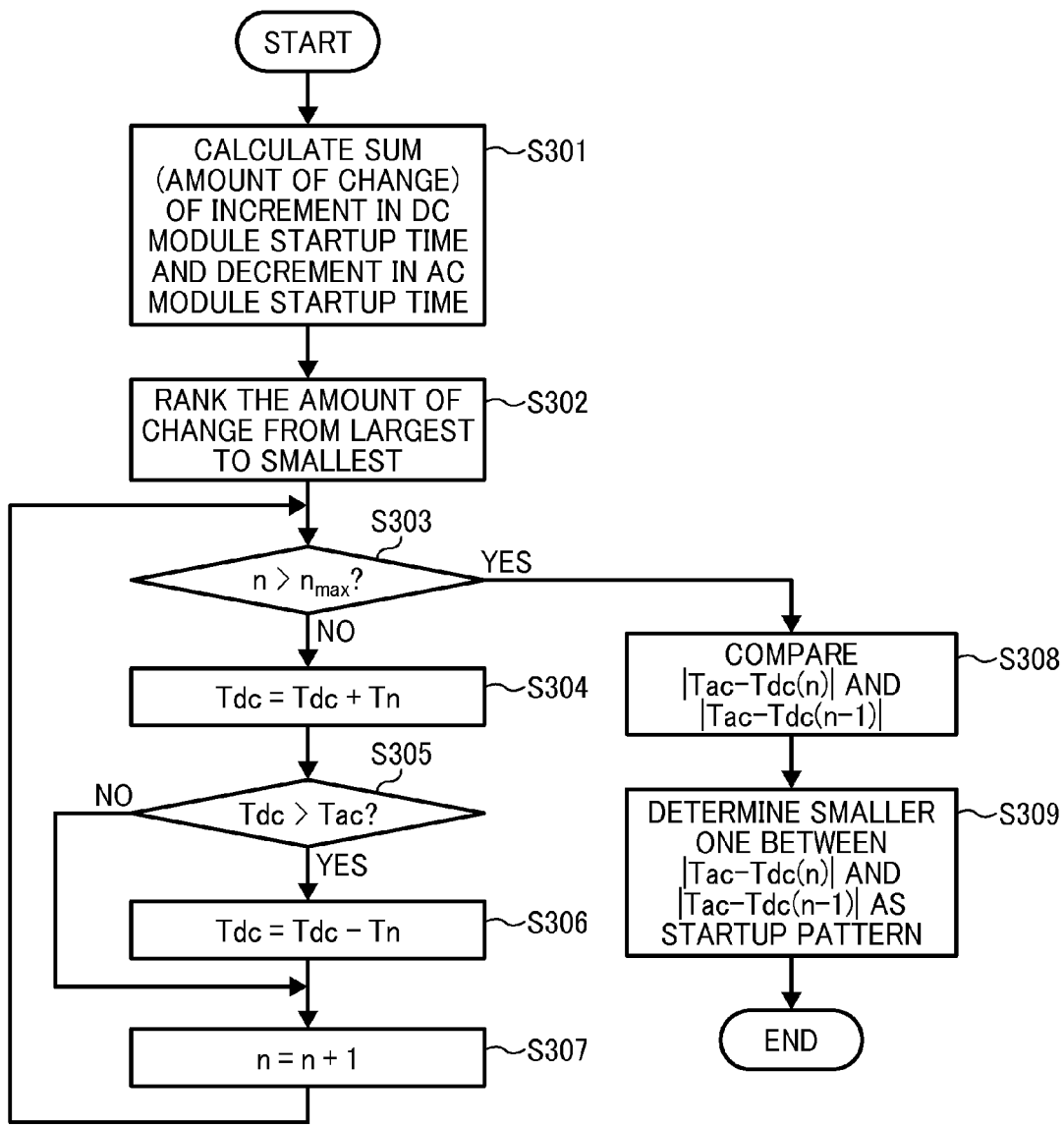
FIG. 9 is a flowchart illustrating a fastest startup pattern searching operation in accordance with an embodiment of the present invention.

FIG. 9 is a flowchart illustrating a fastest startup pattern searching operation in accordance with an embodiment of the present invention.

This operation is considered based on the startup pattern in which all the DC modules start a startup processing at the same time (i.e., S201 in FIG. 6).

In this startup pattern, the AC module startup time is always longer than the DC module startup time. Accordingly, by shifting a startup timing of at least one of the DC modules so as not to overlap with that of the other, the maximum power consumption in the DC modules can be reduced, and therefore the power supplied to the AC module can be increased and the AC module startup time can be shortened.

By repeating the above processing, a startup pattern in which the DC module startup time becomes equal to the AC module startup time can be searched. When a startup timing of one of the DC modules is shifted, the DC module startup time becomes longer by the length of the shifted startup time of the DC module. Here, an increment in DC module startup time caused when a startup timing of a module N is shifted is identified as Tn.

On the other hand, as the maximum power consumption in the DC modules is decreased, power supplied to the AC module is increased, and the startup time of the AC module is shortened. A sum of an increment in DC module startup time and a decrement in AC module startup time caused when a startup timing of one of the DC modules is shifted is calculated (S301). Hereinafter, the sum is referred to as "the amount of change".

The amounts of change calculated in step S301 are ranked from largest to smallest (S302). The module having the largest amount of change is the first candidate to shift its startup timing. The rank of candidate corresponds to the rank of the amount of change. Next, whether n is greater than $n_{max}$ or not is determined (S303). Here, n represents the rank of a DC module which is a candidate to shift its startup timing, and $n_{max}$ represents the number of the DC modules. When $n>n_{max}$ is not satisfied ("No" in S303), it means that there remains a module which can be a candidate to shift its startup timing, and the processing proceeds to step S304.

In step S304, a startup processing start timing Tn of a DC module in the $n_{th}$ rank is shifted to Tdc+Tn at which a DC module having the longest startup time Tdc completes its startup processing (S304). Next, an AC module startup time Tac is compared with a DC module startup time Tdc while the startup timing of the DC module in the $n_{th}$ rank is kept shifted. If the DC module startup time Tdc is greater than the AC module startup time Tac ("Yes" in S305), it means that the AC module startup time and the DC module startup time have reversed, and the operation proceeds to step S306. If the DC module startup time Tdc is not greater than the AC module startup time Tac ("No" in S305), it means that the AC module startup time and the DC module startup time have not reversed, and the operation proceeds to step S307.

When the AC module startup time and the DC module startup time have reversed ("Yes" in S305), the DC module in the $n_{th}$ rank, the startup timing of which has been shifted, is put into the initial startup pattern again in which the startup timing is not shifted (S306).

When the AC module startup time and the DC module startup time have not reversed ("No" in S305), the rank n is increased by one, i.e., the rank becomes n+1 (S307). The processing through steps S303 to S307 is repeated until candidates to shift their startup timing are eliminated. At the time that the candidates to shift their startup timing have been eliminated, the operation proceeds to step S308. In step S308, a difference between the AC module startup time and the DC module startup time is calculated and compared with respect to the modules in the $n_{th}$ and $(n-1)_{th}$ ranks while keeping the startup timings thereof shifted. As a result of the comparison in step S308, a pattern which is smaller in terms of the difference between the AC module startup time and the DC module startup time is determined as the startup pattern (S309).

When $n>n_{max}$ is satisfied ("Yes" in S303), it means that a candidate to shift its startup timing no longer exists, and the operation proceeds to step S308. In step S308, absolute values of Tac−Tdc(n) (i.e., startup time of the DC module in the $n_{th}$ rank) and Tac−Tdc(n−1) (i.e., startup time of the DC module in the $(n-1)_{th}$ rank) are compared (S308). The smaller one therebetween is determined as a startup pattern (S309), and then the operation ends.

A method of selecting DC module and shifting a startup timing thereof is described below.

A purpose of this adjustment is to find out a startup pattern in which the DC module startup time becomes equal to the AC module startup time under a situation in which the AC module startup time is longer than the DC module startup time. To find out such a pattern with a fewer steps, in selecting DC module, a DC module having a large amount of change is selected firstly and shifting of startup timing is started therewith. In shifting the startup timing of the selected DC module, the startup processing start timing of the selected DC module is shifted so as to coincide with the startup processing completion timing of the DC module having the longest startup time.

As described above, the amount of change is represented by a sum of an increment in DC module startup time and a decrement in AC module startup time cause when a startup timing of at least one of the DC modules is shifted. The present method firstly shifts startup timing in a large way to estimate a point where the AC module startup time and the DC module startup time are reversed, and then gradually approaches to a targeted pattern.

FIG. 10A is diagram showing an initial startup pattern. FIG. 10B is an illustration showing a fastest startup pattern searching operation.

The initial startup pattern illustrated in FIG. 10A is changed to the fastest startup pattern illustrated in FIG. 10B. Under an assumption that the DC module U4 is the greatest in terms of the amount of change, the startup processing start timing of the DC module U4 is shifted to coincide with the startup processing completion timing of the DC module U2 having the longest startup time.

As shown in the flowchart illustrated in FIG. 9, the firstly-selected DC module is subjected to a shift of its startup timing, and this operation is repeatedly executed until all the DC module candidates to shift their startup timings are eliminated. The difference between the AC module startup time and DC module startup time is calculated with respect to each candidate, and the smaller one therebetween is determined as a startup pattern.

Alternatively, the startup pattern may be determined by setting a threshold around the median value and completing the process at the time of entering the threshold range.

It is clear from FIGS. 10A and 10B that in the case where the startup timings of the DC modules are distributed, the maximum startup power for the DC modules is decreased. Therefore, by contrast, the startup power for the AC module is increased to shorten the startup time.

In the case where the startup timing of the selected DC module has been already shifted backward (i.e., the rear end of the startup time thereof is overlapped with the startup timing of another module) as shown in FIG. 11A, a blank time period generated due to the shift is eliminated by shifting the startup timing of the module forward as illustrated in FIGS. 11B and 11C.

More specifically, in the case where the amount of change becomes largest when the startup timing of the DC module U4 is shifted, the startup timing of the DC module U4 is shifted to the startup completion timing of the DC module U2 having the longest startup time as illustrated in FIG. 11A. When the AC module startup time is still longer than the DC module startup time under the above condition, if the amount of change becomes second largest when the startup timing of the DC module U2 is shifted, the startup timing of the DC module U2 is shifted to the startup completion timing of the DC module U4, as illustrated in FIG. 11B. In such a case, a blank time period is generated between the startup completion timing of the DC module U1 and the startup timing of the DC module U4.

Thus, a processing for shifting the startup timings of the DC modules U4 and U2 forward is executed so as to eliminate the blank time period.

In accordance with some embodiments of the present invention, the startup order and startup timing of each module is controlled so as to satisfy the above-described fastest startup condition under the following two preconditions: 1) Available power from a power supply to AC and DC modules has an upper limit; and 2) Power supplied to AC and DC modules is always constant (i.e., does not vary with time). In accordance with some embodiments of the present invention, the startup time of the whole apparatus can be shortened not only in the case where the AC module startup time is longer than the DC module startup time but also in the case where the DC module startup time is longer than the AC module startup time.

In accordance with some embodiments of the present invention, the fastest startup pattern can be specified with a fewer steps by shifting startup timings of a DC modules in the order of the amount of change from largest to smallest.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC) and conventional circuit components arranged to perform the recited functions.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

What is claimed is:

1. An image forming apparatus, comprising:
an electric power supply;
a plurality of modules including a plurality of direct current (DC) modules and at least one alternating current (AC) module, to be driven by an electric power supplied from the electric power supply;
a startup time calculator to calculate a startup time of each of the modules; and
a fastest startup pattern determiner to determine a fastest startup pattern based on the startup time of each of the modules calculated by the startup time calculator, and to start up the modules in accordance with the determined fastest startup pattern, the fastest startup pattern determined based on a longest startup time among the startup times of the DC and AC modules,
the fastest startup pattern determined by the fastest startup pattern determiner satisfying one of the following conditions:
(1) When $T_{DC} > T_{AC}$, all the modules start a startup processing at the time of turning on the electric power supply;
(2) When $T_{AC} > T_{DC}$, the DC modules start a startup processing in an order which minimizes power consumption in the DC modules while keeping the startup time of the DC modules within the range of the startup time of the AC module; and
(3) When $T_{AC} \approx T_{DC}$, all the modules start a startup processing at the time of turning on the electric power supply and complete the startup processing at the same time, wherein $T_{DC}$ represents the startup time of the DC modules and $T_{AC}$ represents the startup time of the AC module.

2. The image forming apparatus according to claim 1, further comprising:
  a fastest startup time searcher to search a fastest startup pattern when the startup time of the DC modules is equal to the startup time of the AC module.

3. The image forming apparatus according to claim 1, wherein, in the condition (2),
  the fastest startup pattern determiner shifts a startup order and a startup timing of each of the DC modules so as to reduce power consumption per hour while keeping the startup time of the DC modules within the range of the startup time of the AC module, and
  the fastest startup pattern determiner increases the electric power supplied from the electric power supply to the AC module by an amount equal to the reduced power consumption.

4. The image forming apparatus according to claim 3, wherein the startup order and the startup timing of each of the DC modules are shifted in accordance with a priority given to each of the DC modules based on an increment in the startup time of the DC modules and a decrement in the startup time of the AC module.

5. A method of starting up a plurality of modules, including a plurality of DC modules and at least one AC module, included in an image forming apparatus to be driven by an electric power supplied from an electric power supply, comprising:
  calculating a startup time of each of the modules; and
  determining a fastest startup pattern based on the calculated startup time of each of the modules, the determining including:
    determining the fastest startup pattern based on a longest startup time among the startup times of the DC modules and the AC module; and
    starting up the modules in accordance with the determined fastest startup pattern,
  the fastest startup pattern determined satisfying one of the following conditions:

(1) When $T_{DC} > T_{AC}$, all the modules start a startup processing at the time of turning on the electric power supply;
(2) When $T_{AC} > T_{DC}$, the DC modules start a startup processing in an order which minimizes power consumption in the DC modules while keeping the startup time of the DC modules within the range of the startup time of the AC module; and
(3) When $T_{AC} \approx T_{DC}$, all the modules start a startup processing at the time of turning on the electric power supply and complete the startup processing at the same time,
wherein $T_{DC}$ represents the startup time of the DC modules and $T_{AC}$ represents the startup time of the AC module.

6. The method according to claim 5, further comprising:
  searching for a fastest startup pattern when the startup time of the DC modules is equal to the startup time of the AC module.

7. The method according to claim 5, wherein, in the condition (2),
  a startup order and a startup timing of each of the DC modules is shifted so as to reduce power consumption per hour while keeping the startup time of the DC modules within the range of the startup time of the AC module, and
  the electric power supplied from the electric power supply to the AC module is increased by an amount equal to the reduced power consumption.

8. The method according to claim 7, wherein the startup order and the startup timing of each of the DC modules are shifted in accordance with a priority given to each of the DC modules based on an increment in the startup time of the DC modules and a decrement in the startup time of the AC module.

* * * * *